March 26, 1957 A. R. CONSTANTINE ET AL 2,786,908
ELECTRICAL DISTRIBUTION SYSTEM
Filed Nov. 3, 1954 3 Sheets-Sheet 2
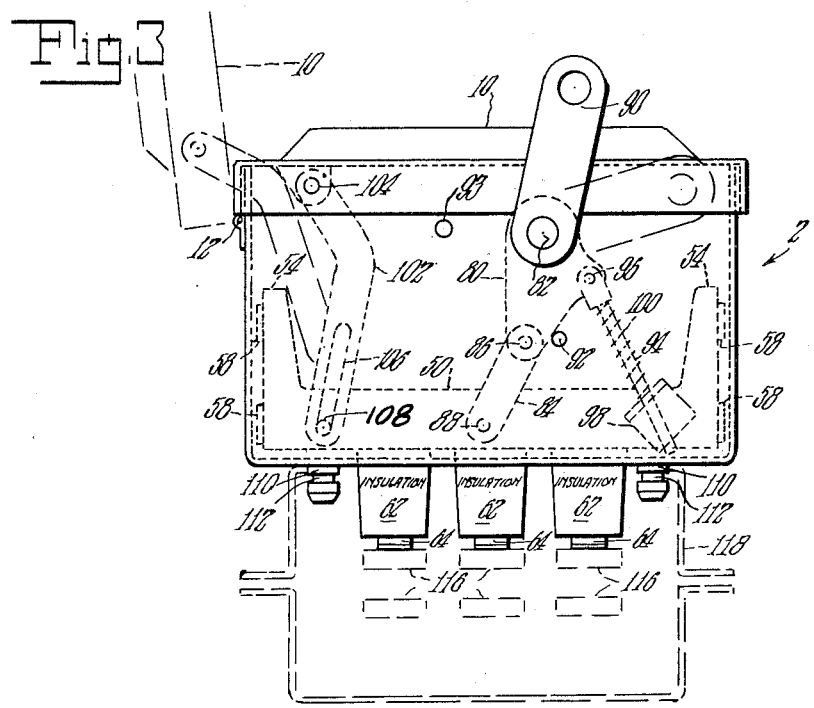
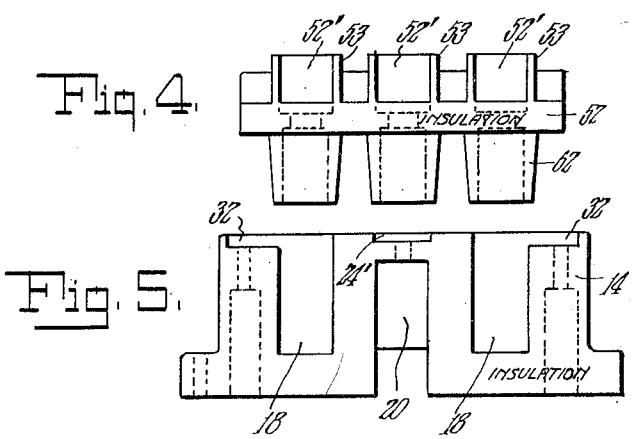
INVENTOR.
Arthur R. Constantine and
BY Elmer T. Carlson March 26, 1957 A. R. CONSTANTINE ET AL 2,786,908
ELECTRICAL DISTRIBUTION SYSTEM
Filed Nov. 3, 1954 3 Sheets-Sheet 3
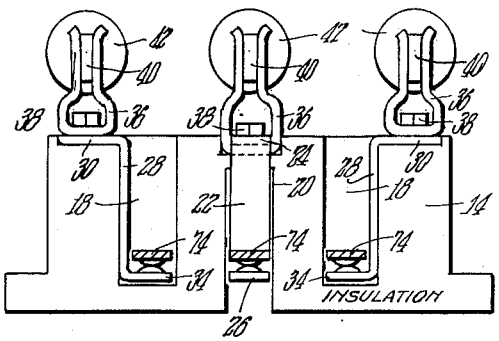
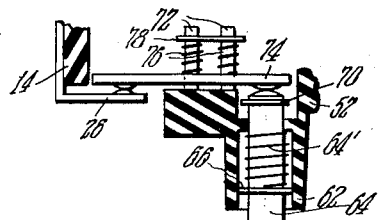
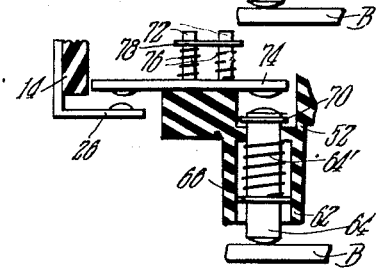
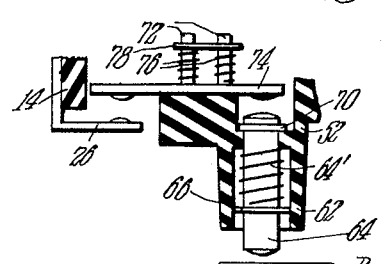
INVENTOR.
Arthur R. Constantine and
BY Homer T. Carlson.

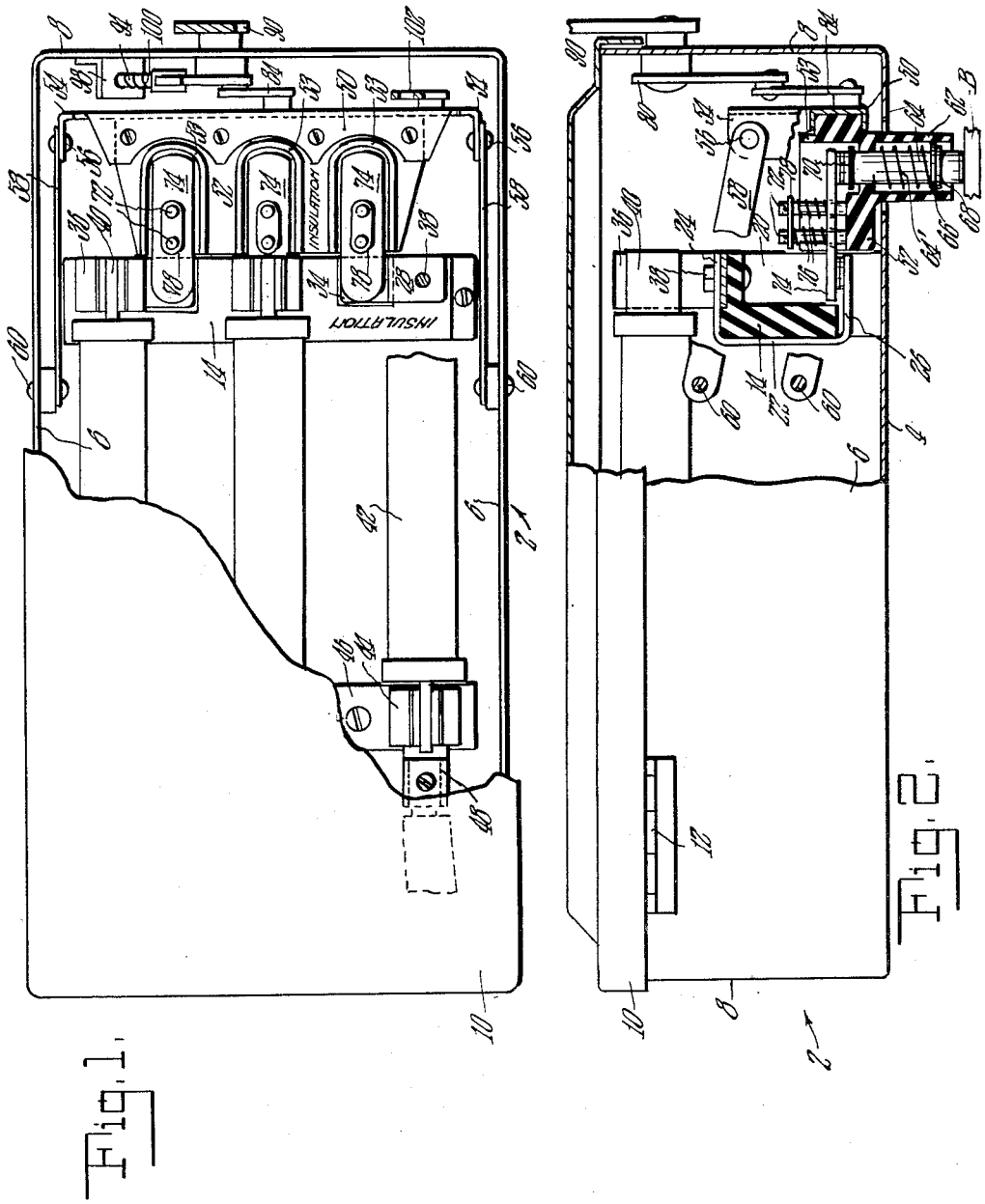

United States Patent Office 2,786,908
Patented Mar. 26, 1957

2,786,908

ELECTRICAL DISTRIBUTION SYSTEM

Arthur R. Constantine, Longmeadow, Mass., and Elmer T. Carlson, New Britain, Conn., assignors, by mesne assignments, to Electric Distribution Products, Inc.

Application November 3, 1954, Serial No. 466,466

5 Claims. (Cl. 200—50)

The invention relates to the class of electrical distribution systems sometimes referred to as the bus-duct type. Such systems generally comprise a duct run containing bus bars and having associated therewith at desired intervals current take-off devices, sometimes identified as plug-in devices.

This application has been divided and the subject matter relating to a switch subcombination has been included in our copending application Serial No. 558,029, filed January 9, 1956, for Electrical Distribution System.

In prior art duct run constructions, the duct run generally includes a metal casing through which the bus bars pass. The casing is usually apertured at various points therealong so as to permit the contacts of a plug-in device to be inserted through the casing and into engagement with the bus bars therewithin.

This invention contemplates a take-off device which provides marked improvement in the electrical circuit efficiency. It offers safety from electrical shock and burns to operating personnel. Further, it conserves labor and materials in its manufacture.

This invention relates particularly to new and useful improvements in a plug-in or connector box having retractable contacts and an interlocked cover to prevent the opening of the box when the contacts are in the engaged position.

It is further directed to connecting means between the connector box and the bus duct with which it is normally associated.

It is the principal object of the invention to provide a novel and improved plug-in device of the type in which the plunger contacts for connecting to the bus bars may be withdrawn into or extended from the plug-in enclosure by safe external means, and in which, the door or cover of the enclosure cannot be opened until the contact plungers are withdrawn away from the bus bars with which they are in contact when in the operative position.

A further feature of the invention is the provision of means whereby, when the cover of the plug-in device can be opened, the entire contents of the box are "dead," or free from current flow.

A still further object of the invention is the provision of means for attaching plug-in devices to opposite sides of an insulator support, and to make the contact with the bus bars on opposite sides thereof by means of contactors passing through openings in the insulators and held under pressure against the bars.

Practically all of the commercial forms of bus duct consist of an elongated housing, which has spaced intermittently along its length porcelain or other insulators, which support the bus bars. Something equivalent to a knife switch is introduced for each one of the conductors at a plug-in window or opening in order to make the desired connection. Ordinarily, the access opening is located in between the insulators.

The plug-in systems of prior art manufacture require that in effect a knife switch type of plug connector be made in an open window at voltages of as much as 600 volts. This objection is complicated by the fact that the workman concerned therewith may be on top of a ladder or scaffold where the danger from falling is as great as the hazard from electrical shock. One of the main objectives of the present invention is to overcome this hazard and to make the device not only safe but also foolproof.

Due to the lack of standardization in prior art devices, there is a large inventory cost in almost all of the existing bus ducts. One of the prime purposes of the device of this invention is to overcome this objection.

Further, the existing equipment is expensive in respect to the materials employed. The present invention contemplates reducing the cost of the component parts, as well as reducing the diversity thereof.

The prior art bus way has access openings for plug-in purposes which can be opened by a workman at any time without regard to the position of his plug-in mechanism. The present device has eliminated such possibility. The workman here cannot open the bus duct window unless he has first applied his plug-in mechanism to a position which assures that the window is covered and is safe. The same would be true of any inspection or test equipment which might be attached to a test plug-in mechanism such as meters and the like.

The way in which this interlock or safety lock is accomplished is that the plug-in mechanism must depress pins which otherwise prevent the slider from operating. When the plug-in mechanism depresses the pins, the slider in the wall of the bus way is free to move.

Unlike all existing bus ducts, the idea of pinching or clipping on the conductor for contact has been given up. The new form of plug-in involves a high pressure contact of the character of a circuit breaker contact rather than a knife switch. To assure that the condition will be favorable, each of the bus bars will be silver plated, and the contact will be silver coated.

In accomplishing the arrangement of the plug-in, there are the following features to consider:

(a) As the operating handle outside of the box first swings, it brings the individual contactors into engagement with the bus bars.

(b) On further downward motion the toggle action is thrown beyond its toggle center to apply pressure to the bus bars.

(c) Coincidentally with the throwing of the toggle beyond its toggle dead center, there is the swinging of double break contact switches which close circuits.

(d) The door must be closed before you can operate this handle and the door lock is secured before even the first contact is made. In reversing to open, the toggle assures a quick break and coincidentally the double break switch opens the circuit, followed by the breaking of the contact engagement with the bus bar itself. The last thing that happens is the release of the door lock.

The important consideration is that the plug-in box can be a standard component and the interior electrically protective equipment can vary with the demand of the particular job. For example, it can be a fuse protective device, a circuit breaker mechanism, special test mechanism, or individual adapting mechanism such as transformer, wiring terminal board, or the like.

It will be evident also that the structure of the invention can be used for other than general distribution purposes such as, starting and control circuits, in which case the plug-in box might include the motor starter, the motor protective equipment, or the program control of a particular machine tool, or the special warning apparatus incident to the operation of a particular tool. In other words, wherever a box of the conventional motor starter or control type is used, the plug-in box can be adapted.

These plug-in devices are equally adaptable to many other product classes such as, panelboards, switchboards, safety switches, motor control center, enclosed circuit breakers, motor control devices, drawout switchgear, and the like.

All of the above cited objects we accomplish by means of such structure and relative arrangement of parts thereof, as will fully appear by a perusal of the description below.

Fig. 1 is a plan view of the plug-in box of the invention with a portion of the cover thereof removed;

Fig. 2 is a combined side elevational and sectional view through the box shown in Fig. 1;

Fig. 3 is an end elevational view of the box shown in Fig. 1;

Figs. 4 and 5 are side elevational views of insulators;

Fig. 6 is an elevational view of the fixed insulator with the stationary contactors associated therewith; and Figs. 7, 8 and 9 are diagrammatic views showing various relationships of the stationary and movable contactors with the switch bars associated therewith.

Referring now to the drawing more in detail, in which similar characters of reference indicate corresponding parts in the several figures and referring more particularly to the preferred form of our invention selected for illustrative purposes, we have shown a box 2 which has bottom, side and end walls 4, 6 and 8. A cover 10 is suitably hinged to the box, as at 12, for swinging between the closed position shown and an open position indicated by dash lines in Fig. 3.

An insulator 14, a side elevational view of which is shown in Fig. 5, is secured by suitable means, such as screws to the bottom wall 4 of the box 2. The insulator has recesses 18 which are open at upper sides thereof and a recess 20 which is open at its lower side. See Fig. 5.

A stationary contactor 22 of suitable metal, more or less in the shape of a C, is provided and has an upper portion 24 in a notch 24' of insulator 14. A lower part 26 of said connector extends forwardly, as shown in Fig. 2.

Other stationary contactors, such as 28, have upper portions 30 in recesses 32 of insulator 14 and have lower portions 34 in the recesses 18 thereof.

The connectors just described may be connected in circuits or portions thereof or to components in circuits. For illustrative purposes, clips such as 36 and upper portions of the contactors are secured to the insulator by such means as bolts 38.

The clips 36 receive tangs 40 of fuse members 42 having tangs on opposite ends which are receivable in similar clips such as 44 secured to an insulator 46 that is secured in turn to the box. A lug 48 is secured to each clip 44 for connection to the wiring of a circuit.

Cables or wiring may be brought into the box through knock-out openings as is usual in electrical equipment.

A circuit breaker or breakers or other devices may be used in the box in lieu of the fuse member, if desired.

A carrier is provided which includes a transverse channel 50 having an insulator 52 secured therein in a suitable manner. The channel has opposite ends 54 pivotably connected at 56 to the ends of parallel links 58 which are pivoted at 60 to the side walls 6 of the box. By means of the links the carrier is movable up and down to extend and retract contactors to be described.

The insulator 52 is provided with outwardly extending hubs 62 in which movable contactors 64 are reciprocable. The contactors are urged outwardly relative to the hubs by springs 64' which act on washers or bearing rings 66 slidable in the hubs and held in the contactors by split rings 68 in grooves of the contactors or the like. Other split rings 70 in grooves at the upper ends of the contactors limit outward movements thereof.

Guides 72 fixed in the insulator 52 have metallic blades 74 slidable up and down thereon. Springs 76 between the blades and abutments 78 urge the blades downwardly. See Fig. 2.

Portions of the blades are adapted to engage the stationary and movable contactors and the engageable portions of these components are provided with engageable buttons commonly employed in circuit opening and closing apparatus. The blades may be referred to as switch devices for connecting the stationary and movable contactors.

Operating mechanisms for extending and retracting the insulator 52, and thereby the contactors 64, are provided.

A lever 80 is fixed to a shaft 82 journalled in the end wall of the box and is pivotally connected to the channel of the carrier as by a link 84 pivoted at 86 and 88 to the lever and channel. See Fig. 3. A manually engageable member 90 is fixed to said shaft.

The parts are shown in the extended position of the contactors 64 wherein the lever 80 abuts a stop 92. The parts are so arranged that the pivot 86 is slightly on one side of a line extending through the pivot 88 and the axis of shaft 82. This is so that the lever and link function with a toggle action whereby the parts are releasably held in extended positions of the contactors 64.

A rod 94 pivoted at 96 to the lever 80 has an end freely slidable in a bracket 98 and a spring 100 acts to bias the lever 80 to the positions shown in Fig. 3.

By swinging member 90 clockwise the carrier is moved upwardly so that the contactors 64 are moved upwardly or are reciprocated from extended position. During this movement of the carrier, the blades 74 are moved out of contact with portions 26, 34 of the stationary contactors for circuit opening purposes. Clockwise movement of member 90 is limited by a stop 93 which is engageable by the lever 80.

Thus by swinging the lever 90 clockwise from its releasably locked position shown in Fig. 3, wherein the contactors 64 are in extended position, the carrier is elevated to retract the contactors and the blades 74 break contact with the contactors 34, 26. By swinging the lever counter-clockwise the carrier is moved downwardly to extend the contactors and make connections between the blades and contactors.

The contactors 64 being spring pressed as they are the free ends thereof are adapted to make contact with energy supply members such as conductors in the form of bus bars or the like.

It will be noted that the contacting portions of the stationary contactors and blades are disposed in the recesses 18 and 20 of the insulator 14 while the contacting portions of the blades and movable contactors are disposed in wells 52' of carrier insulator 52 which are surrounded by upstanding barriers 53. Thereby arcing and other objectionable results are avoided which is inherent in prior art devices.

The plug-in or connector box is adapted for a wide range of uses where it is desired to make connection with energy supply conductors. For instance the box may be used in connection with duct construction such as shown and described in our pending application.

In such a case it is desired that the box be releasably locked to the duct and that the cover of the box be held in closed position while the box is connected to the duct with the contactors in extended position.

To that end a link 102 is pivoted at 104 to the cover and has an elongated slot 106 in its free end. A stud 108 of the carrier is disposed in the slot 106 so that as the contactors are in extended position the cover is held against swinging to open position. As the carrier is elevated to retract the contactors the cover is released for opening.

The cover and box may be provided with locking means well known in switch boxes, junction boxes and the like.

The box may be provided with various means adapted to cooperate with the lock means of a duct or the like on which it is mounted. In the form of the invention shown such means consists of studs 110 fixed to the bottom wall 4 of the box which are provided with annular grooves 112.

Movable doors or slide plates of a wall of the duct engage the grooves of the studs which extend through the said wall for locking engagement as appears in the before mentioned application. In locked position on the duct the contactors may be extended to contact energy supply means 116 such as bus bars associated with a duct 118.

The plug-in box may be connected to a panel or to a wall of any apparatus having means for engaging the studs or similar means thereof so that the contactors may be contacted with energy supply conductors associated with the said wall.

The novel operation and arrangement of the circuit closing and opening mechanism will be described in detail with particular reference to Figs. 7, 8 and 9 wherein a single contactor 64 and a single bus bar B is shown. A single stationary contactor 26 is shown.

It will be assumed that the contactor is in engagement with a bus bar represented by B and is urged thereagainst by spring 64'. In this position the cover 10 is held closed by link 102 as described.

To disengage the contactor 64 from the bus bars B, member 90 is swung clockwise breaking the toggle and initially moving the contactor carrier 52 upwardly from the position of Fig. 7. This causes the carrier to lift the blade 74 out of contact with stationary and movable contactors 26 and 64. In this initial movement contactor 64 is not elevated but its lower end is held in engagement with the bus bar B by spring 64'. Thus there is a double break as two points of contact are broken initially while the contactor 64 remains in contact with the bus bar.

Subsequent to the initial movement of the carrier and when the blade 74 is out of contact with contactors 26 and 64 further swinging of member 90 and upward movement of the carrier moves the contactor 64 out of engagement with the bus bar B as in Fig. 9. The operating mechanism is thereafter actuated to the limit of its movement whereupon the link 102 permits the cover 10 to be opened.

The parts are constructed and arranged whereby the carrier may not be moved to extend the contactor while the cover is in its open position.

In extending the contactor for engaging the bus bar the cover 10 must be closed to allow the carrier to be moved. With the cover in closed position the member 90 is swung counterclockwise and before the switch blade 74 is moved sufficiently to make contact with contactors 26 and 64 the end of contactor 64 engages the bus bar B. Thus the contactor 64 being spring pressed it yieldingly engages the bus bar for a good firm contact.

As the carrier approaches the limit of its movement the blade 74 at opposite ends thereof makes simultaneous contact with the contactors 26 and 64.

Thus as the member 90 is swung to extend the contactor the said contactor first makes contact with the bus bar. Thereafter there is a double contact of the blade and contactors 26 and 64 to complete a circuit when the mechanism arrives at its locked toggle position. Reversely when the contactor is to be retracted there is at about the time the toggle lock is broken, a double break of the blade and contactors 26 and 64 and thereafter a break between contactor and bus bar B.

Thus the parts and the operation thereof is such as to provide a quick double break for opening a circuit while the contactor remains in engagement with the bus bar and thereafter a break of the contactor and bus bar. Also there is a quick double contact to close a circuit subsequent to contact of the contactor and bus bar and the springs shown and described provide yieldable and firm contacts of the parts.

While we have illustrated and described the invention as embodied in a specific arrangement, we do not intend to be limited to the details shown since various modifications and structural changes may be made without departing in any way from the spirit of the invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the claims below.

What it is desired to claim and secure by Letters Patent of the United States is:

1. A plug-in connector box for connecting an electric circuit to a busway having bus bars, comprising in combination a receptacle having an opening at one side through which primary contacts are adapted to extend to contact bus bars in the busway and having an opposite side open for access to the interior of the receptacle, a cover hingedly connected to the receptacle and swinging to a position closing the opposite side of the receptacle and having an open position permitting access to the interior of the receptacle, primary contacts reciprocable relative to the receptacle, having a retracted position and having an extended position in which the primary contacts protrude through the opening first mentioned in position to engage the bus bars, operating means within the receptacle operable to reciprocate the primary contacts between the retracted position and the extended position to manually engage means external to said receptacle, for actuating the operating means, and means connecting the cover and the operating means to retain the cover in closed position while the primary contacts are extended and engaging the bus bars and to release the cover in the retracted position of the primary contacts.

2. A plug-in connector box construction for connecting an electric circuit to electrical bus bars within a busway, comprising in combination a receptacle having an opening in one side through which primary contacts can protrude to contact the bus bars, and having an access opening at the opposite side, a cover hingedly connected to the receptacle and swingable between open and closed positions with respect to the access opening, primary contacts reciprocable between a retracted position and an advanced position protruding from the opening to engage the bus bars, an insulating movable contact carrier mounting the primary contacts, resilient means mounting the primary contacts on the insulating movable contact carrier, operating mechanism for reciprocating the insulating movable contact carrier between a retracted and an extended position, stationary contacts disposed in operating relation to the primary contacts, secondary switch contacts mounted on the insulated movable contact carrier and in one position of the insulated movable contact carrier engaging the primary contacts and the stationary contacts, manually engageable means external to the receptacle connected to the operating mechanism, and locking means operatively connecting the operating means and the cover and adapted to lock the cover closed when the primary contacts are engaged with the bus bars and to release the cover in a retracted position.

3. A plug-in connector box construction of claim 2, in which the secondary switch contacts comprise spring pressed blades having portions which engage the primary contacts and the stationary contacts in extended position of the insulated movable contact carrier, and which disengage in retracted position.

4. A plug-in connector box construction of claim 2, in which insulating movable contact carrier comprises guide means guiding the primary contacts in relative reciprocation.

5. A plug-in connector box construction of claim 2, in which the operating mechanism includes a swingably mounted lever pivotally connected to said carrier arranged to releasably lock the operating mechanism in extended position of the primary contacts and means biasing said operating mechanism in said locked position.

References Cited in the file of this patent

UNITED STATES PATENTS

| | | |
|---|---|---|
| 1,807,526 | Hammerly | May 26, 1931 |
| 1,946,504 | Sachs | Feb. 13, 1934 |
| 2,111,421 | Faile | Mar. 15, 1938 |
| 2,143,697 | Jackson | Jan. 10, 1939 |
| 2,536,522 | Wilson | Jan. 2, 1951 |
| 2,555,331 | Grady | June 5, 1951 |
| 2,659,843 | McNicol | Nov. 17, 1953 |
| 2,669,624 | Ferguson | Feb. 16, 1954 |